3,506,296
OPTIONAL DIGGER FOR GARDEN AND LAWN
Charles W. Nelson, Rte. 1, Box 199-A,
Minden, La. 71055
Filed Feb. 12, 1968, Ser. No. 704,594
Int. Cl. A01b 1/16
U.S. Cl. 294—50.7      1 Claim

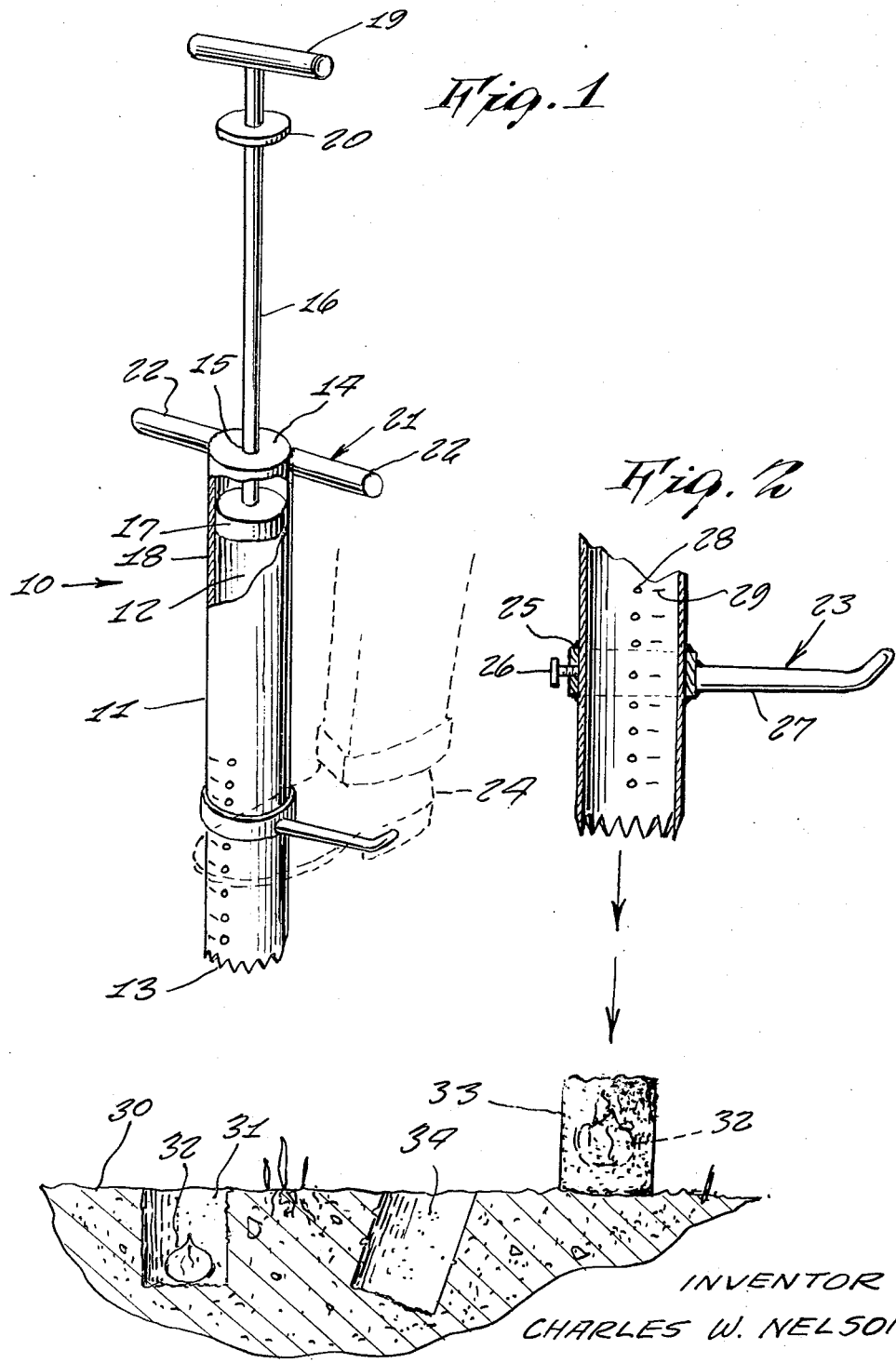

ABSTRACT OF THE DISCLOSURE

A tubular digging tool for lifting a cylindrical clod of earth, the tool being accordingly adaptable for transplanting seedlings and bulbs and the like.

---

This invention relates generally to hand operated garden tools.

A principal object of the present invention is to provide an optional digger for gardens and lawns, and which is particularly suitable for lifting a cylindrical clod of earth and transporting it to another place.

Another object of the present invention is to provide an optional digger for gardens and lawns, and wherein the digger comprises a cylindrical tube into which a plug or clod of earth is forced when the lower end of the tool is pushed into the ground, the tool further including a foot lever, and the digger further including a manually operated plunger at the upper end of the tube for the purpose of forcibly ejecting a plug of earth from within the tube.

Yet another object of the present invention is to provide an optional digger for gardens and lawns and wherein the tube is calibrated with spaced apart dash marks and openings so as to clearly indicate to a user the depth of a clod of earth contained therewithin.

Yet a further object of the present invention is to provide an optional digger wherein the lower edge of the tubular member is serrated with a plurality of cutting teeth for the purpose of easily digging into the ground.

Other objects of the present invention are to provide an optional digger for gardens and lawns which is simple in design, inexpensive to manufacture, rugged in construction, easy to use and efficient in operation.

These and other objects will be readily evident upon a study of the following specification and the accompanying drawing, wherein:

FIGURE 1 is a perspective view of the present invention shown partly in cross section, and FIGURE 2 is an enlarged fragmentary cross sectional view thereof shown in operative use.

Referring now to the drawing in detail, reference numeral 10 represents an optional digger for gardens and lawns according to the present invention wherein there is cylindrically configurated tube 11 having a central cavity 12 therewithin, the lower end of the tube being open to the cavity 12, and the lower edge of the tube being serrated with a plurality of cutting teeth 13. The teeth 13 provide a means for digging into hard ground by a slight rotation thereof.

The upper end of the tube is provided with an end wall 14 having a central opening 15 therewithin through which a plunger rod 16 extends. The end of plunger rod within the tube is provided with a plunger head 17 that is in frictional sliding engagement with the inner surface of the side wall 18 of the tube. The opposite end of the plunger rod is provided with a transverse extending handle 19 near which there is located a disc configurated stop 20 which limits the inward travel of the plunger rod into the tube.

Near the upper end of the tube 11, there is a sidewardly extending main handle 21 comprised oppositely extending handle bars 22.

A foot lever 23 is adjustably mounted around the outer side of the tube 11, the foot lever providing a means for an operator's foot 24 to bear thereagainst in order to exert pressure when forcing the tube 11 into the ground. The foot lever includes a circular collar 25 that is fitted around the outer side of the tube 11, the collar having a set groove 26 extending regularly therethrough for purpose of locking the same at a selected height along the tube. A sidewardly extending foot rest 27 is integrally welded or otherwise fastened to the collar 25, the foot rest extending radially outwardly from the collar 25.

A plurality of small openings 28 and a plurality of dash marks 29 are spaced equal distance along the side of the tube 11 and provide a means for indicating a measurement of the depth of a plug or earth contained within the tube.

In operative use, the present tool may be used for digging out a plug of earth from the ground 30 so to form a cylindrical opening 31 within which a bulb 32 or other plant may be positioned for planting. The plug 33 of earth may contain a bulb or seedling already, the tool thus serving as a device for transplanting the same in an undisturbed manner without loosening the seedling or bulb from the surrounding earth. As is shown in FIGURE 2 of the drawings, it is to be noted that the device may be used by pushing into the earth in a vertical direction or it may be pushed into the earth in an inclined direction to make an inclined opening 34. When the tool is used for transplanting, the plug of earth becomes lodged within the cavity 12 of the tube 11, thus permitting the same to be transported to another site. When it is desired to dislodge the plug of earth from within the cavity, the plunger handle 19 is forced downwardly so that the plunger 17 bears against the upper end of the plug of earth thus causing the same to be pushed out of the lower end of the tube. It is of course noted that the plunger will rise upwardly within the tube 11 during digging operation, as a plug of earth is force inwardly into the lower end of the tube.

Thus there has been provided an optional digger for gardens and lawns which will serve a large number of digging purposes among which one of the uses is the transplanting of seedlings and bulbs without disturbing the same from the surrounding earth.

While various changes may be made in the detailed construction, it is understood that such changes will be within the spirit and scope of the present invention as is defined by the appended claim.

I claim:

1. In a digger for gardens and lawns, the combination of a cylindrical tube, means for said tube to dig up a plug of earth, transport the same to another site, and means for discharging said plug of earth from said tube, said means for digging up a plug of earth comprises the lower end of said tube having an edge formed into a plurality of downwardly pointed teeth whereby upon slight rotation and downward pressure thereof, a plug of earth may be formed and forced thereinto when inserting said tube into the ground, said means for extracting said plug of earth from said tube comprising a plunger, the upper end of said tube having an end wall with a central opening therein, said central opening receiving a rod of said plunger, the end of said plunger rod within said tube having a plunger head in sliding frictional engagement with the inner surface of a side wall of said tube, the opposite end of said plunger rod having a transverse extending handle and a circular disk being mounted in spaced relation from said handle upon said plunger rod defining a limit stop for inward travel of said plunger rod into said tube, the upper end of said tube being provided with a pair of opposite sidewardly extending handle grips defining a main handle, a foot lever being adjustably secured around said tube, said foot lever comprising a slideable collar around said tube, a set screw extending radially through said collar for selected securement thereto and said collar having a sidewardly extending foot rest upon which an operator's foot may be placed for exerting downward pressure when inserting said tube into the ground, and a plurality of equally spaced apart openings and dash-marks along said tube providing measurement indications for the depth of a plug of earth contained within said tube.

References Cited

UNITED STATES PATENTS

| 1,952,585 | 3/1934 | Croasdale | 294—50.7 |
| 2,612,725 | 10/1952 | Casey | 294—50.6 |

FOREIGN PATENTS 865,902   4/1961   Great Britain.

EVON C. BLUNK, Primary Examiner

D. WATTS, Assistant Examiner